United States Patent
He et al.

(10) Patent No.: US 10,255,667 B2
(45) Date of Patent: Apr. 9, 2019

(54) QUANTITATIVE VISUAL PERCEPTION QUALITY MEASUREMENT FOR VIRTUAL DESKTOPS

(71) Applicant: VMWARE, INC., Palo Alto, CA (US)

(72) Inventors: Xingze He, San Jose, CA (US); Banit Agrawal, Cupertino, CA (US); Rishi Bidarkar, Sunnyvale, CA (US); Hari Sivaraman, Livermore, CA (US); Uday Kurkure, Los Altos Hills, CA (US)

(73) Assignee: VMware, Inc., Palo Alto, CA (US)

( * ) Notice: Subject to any disclaimer, the term of this patent is extended or adjusted under 35 U.S.C. 154(b) by 180 days.

(21) Appl. No.: 15/213,445

(22) Filed: Jul. 19, 2016

(65) Prior Publication Data
US 2017/0186147 A1     Jun. 29, 2017

(30) Foreign Application Priority Data
Dec. 23, 2015   (IN) ........................ 6845/CHE/2015

(51) Int. Cl.
*G06K 9/40*     (2006.01)
*G06T 7/00*     (2017.01)
(Continued)

(52) U.S. Cl.
CPC ............ *G06T 7/0002* (2013.01); *G06T 5/003* (2013.01); *G06T 7/0022* (2013.01); *H04L 67/42* (2013.01)

(58) Field of Classification Search
CPC ....... G06T 7/0002; G06T 5/003; G06T 5/001; G06T 7/001; G06T 9/40; H04L 67/42
See application file for complete search history.

(56) References Cited

U.S. PATENT DOCUMENTS

| | | | | |
|---|---|---|---|---|
| 5,400,667 A | * | 3/1995 | Feng | ............... H04N 17/00 283/70 |
| 2011/0033119 A1 | * | 2/2011 | Rezazadeh | ............. G06K 9/4604 382/199 |

(Continued)

OTHER PUBLICATIONS

Huan Yang et al. "Perceptual Quality Assessment of Screen Content Images", IEEE Transactions on Image Processing, vol. 24, No. 11, pp. 4408-4421, Nov. 2015.*
(Continued)

*Primary Examiner* — Samir A Ahmed
(74) *Attorney, Agent, or Firm* — Novum Patent Services (57) ABSTRACT

Techniques are described for improving the measurement of visual perception of graphical user interface (GUI) information remoted to client devices in virtual desktop environments, such as VDI and DAAS. An objective image quality measurement of remoted virtual desktop interfaces is computed, that is more accurate and more closely aligned with subjective user perception. The visual quality metric is computed using a linear fusion model that combines a peak signal to noise ratio (PSNR) score of the distorted image, a structural similarity (SSIM) score of the distorted image and a feature similarity (FSIM) score of the distorted image. Prior to using the model to compute the quantitative visual perception metric, the linear fusion model is trained by using a benchmark test database of reference images (e.g., virtual desktop interface images), distorted versions of those images and subjective human visual perception quality ratings associated with each distorted version.

17 Claims, 8 Drawing Sheets

(51) Int. Cl.
*G06T 5/00* (2006.01)
*H04L 29/06* (2006.01)

(56) References Cited

U.S. PATENT DOCUMENTS

| | | | | |
|---|---|---|---|---|
| 2011/0274361 | A1* | 11/2011 | Bovik | G06K 9/00664 |
| | | | | 382/224 |
| 2013/0163896 | A1* | 6/2013 | Chen | G06T 3/0068 |
| | | | | 382/278 |
| 2014/0320673 | A1* | 10/2014 | Agrawal | H04N 21/25825 |
| | | | | 348/189 |

OTHER PUBLICATIONS

L. Zhang et al., "Fsim: a feature similarity index for image quality assessment," Image Processing, IEEE Transactions on, vol. 20, No. 8, pp. 2378-2386, 2011.
N. Ponomarenko et al., "Tid2008—a database for evaluation of full-reference visual quailty assessment metrics," Advances of Modern Radioelectronics. vol. 10, No. 4, pp. 30-45, 2009.
E. C. Larson et al., "Categorical image quality (csiq) database," Online, http://vision. okstate. edu/csiq, 2010.
D. Chandler et al., "A57 database," 2007.
T.-J. Liu et el., "Image quality assessment using multimethod fusion," Image Processing, IEEE Transactions on, vol. 22, No. 5, pp. 1793-1807, 2013.
L. Spracklen et al., "Comprehensive user experience monitoring." VMware Technical Journal, 2012.

\* cited by examiner

QUANTITATIVE VISUAL PERCEPTION QUALITY MEASUREMENT FOR VIRTUAL DESKTOPS

RELATED APPLICATION

Benefit is claimed under 35 U.S.C. 119(a)-(d) to Foreign Application Serial No. 6845/CHE/2015 filed in India entitled "QUANTITATIVE VISUAL PERCEPTION QUALITY MEASUREMENT FOR VIRTUAL DESKTOPS", filed on Dec. 23, 2015, by VMware, Inc., which is herein incorporated in its entirety by reference for all purposes.

TECHNICAL FIELD

The present disclosure generally relates to measuring visual perception quality of images and more particularly relates to obtaining quantitative visual perception quality measurements of user interfaces remoted in virtual desktop infrastructure environments.

BACKGROUND

With the rising popularity of cloud computing, remote desktop environments, such as those based on Virtual Desktop Infrastructure (VDI) and Desktop-as-a-Service (DAAS) have become rapidly growing industries. In a conventional VDI or DAAS environment, a user is provisioned a virtual desktop and is allowed to access their virtual desktop over a remote network connection, such as a WAN connection. The virtual desktops are typically hosted on servers that reside in a data center of the enterprise (or a third party service provider), and each host server may execute multiple virtual desktops. Users can utilize a client device to remotely log into their individual virtual desktop and all of the application execution takes place on the remote host server which is linked to the local client device over network, using a remote display protocol such as remote desktop protocol (RDP), PC-over-IP (PCoIP) protocol, virtual network computing (VNC) protocol, or the like. Using such a remote desktop protocol, the user can interact with applications of the virtual desktop, which are running on the remote host server, such that only the display, keyboard, and mouse information is communicated with the local client device. A common implementation of this approach is to host multiple desktop operating system instances on a server hardware platform running a hypervisor.

In many ways, VDI and DAAS provide a more centralized and efficient computing environment because each user is able to access their individual desktop from any device capable of making a network connection and from virtually any location. All of the user data is stored in the cloud (e.g., in a remote data center), providing more centralized management and quality of control for the organization that may employ the individual users.

End-user experience plays a key role for the seamless transition from traditional workstations to virtual desktops, such as VDI and DAAS. Remote display protocols provide the display of the virtual desktops or applications to the end-user and it is essential for the protocol to provide the same look (visual perception) and feel (responsiveness) as physical workstations. While the responsiveness metric has been studied in great details from the evolution of VDI, there has been less focus and exploration on the visual perception because of its subjective evaluation. However, understanding visual perception quality objectively is important when deploying a virtual desktop solution so that appropriate amount (and type) of resources can be allocated and utilized. For example, both responsiveness metrics and visual perception measurements can be useful to benchmark different CPU architectures, hosts, storage architectures and to study the impact of different configurations and optimizations that can be done at different layers of hardware and software stack of a VDI or DAAS deployment. Often, slight changes in image quality can significantly change the underlying bandwidth usage (e.g., in some cases, up to 30% or more). For example, PCoIP is a display protocol implemented in VDI which first provides an initial image of lower quality and then builds to lossless quality (100% quality). In the case of VDI, perceptually lossless quality of 90% can usually provide the same look and feel of VDI desktops to the end user and hence there is no need to build to fully lossless quality except in certain circumstances. This can provide substantial bandwidth savings (e.g., up to 20%) and can therefore reduce the required allocation of resources needed to deploy a VDI solution. As such, there is a need to understand visual perception objectively and to include it in a comprehensive user experience analysis.

SUMMARY

Systems and methods in accordance with various embodiments of the present disclosure overcome at least some of the above mentioned shortcomings and deficiencies by providing improved ways to measure the visual perception of graphical user interface (GUI) information remoted to client devices in virtual desktop environments, such as VDI and DAAS. In particular, the described embodiments are able to obtain an objective image quality measurement of remoted virtual desktop interfaces that is more accurate and more closely aligned with subjective user perception.

To obtain the quantitative measurement of visual perception quality, a client device receives a distorted image of a virtual desktop interface displayed by a remote server over a network. In some embodiments, the image may have been distorted by several types of distortion, such as compression used to reduce the size of the image (e.g., JPEG compression) and the transport protocol used to transmit the image from the server (e.g., PCoIP). Once the client has received the distorted image, the distorted image of the virtual desktop interface is displayed by the client device. A visual quality assessment module on the client then captures a screenshot of the distorted image and the screenshot can be compared to an original distortion-free reference image which is also available on the client. Based on the comparison of the two images, a visual quality metric is computed for the screenshot of the distorted image. The visual quality metric is computed using a linear fusion model that combines a peak signal to noise ratio (PSNR) score of the distorted image, a structural similarity (SSIM) score of the distorted image and a feature similarity (FSIM) score of the distorted image. Prior to using the model to compute the quantitative visual perception metric, the linear fusion model is trained by using a benchmark test database of reference images (e.g., virtual desktop interface images), distorted versions of those images and subjective human visual perception quality ratings associated with each distorted version.

DETAILED DESCRIPTION

As used throughout this disclosure, the terms "remote desktop, "virtual desktop" and "desktop" are used interchangeably and refer to an instance of an operating system or application that runs remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user that owns the virtual desktop can remotely log into their virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote desktop protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device even though the desktop is actually executing remotely.

As previously mentioned, due to the fact that a GUI of a virtual desktop is remoted over a network, user experience is usually affected in terms of (1) responsiveness and (2) visual perception. Consequently, measuring the visual perception quantitatively is important to benchmarking and resource allocation decisions for the reasons discussed above.

The general notion of measuring image quality is not new in the field of video/image processing. There has been a number image quality techniques proposed, such as PSNR (Peak Signal to Noise Ratio), SSIM (Structural Similarity), FSIM (Feature Similarity), among others. Some of these metrics perform very well on natural images in the sense that the metric scores produced by these techniques consistently correlate with human subjective quality ratings. However, as will be illustrated in further detail below, these conventional techniques do not perform as well in VDI environments. This is due to the fact that a desktop screen may present a wide spectrum of images, including images with sharp edges, such as text and windows, colorful natural images (e.g., photographs or videos), small icons, menu bars and other images typically found in desktop interfaces. All of these variations in imagery increase the complexity of visual quality assessment, such that conventional image quality techniques no longer provide a satisfactory performance (i.e., they do not correlate as well to subjective human experience ratings).

To create a model for measuring the visual perception quality for VDI desktops, the present disclosure utilizes a benchmark visual quality database that is representative of VDI desktops and comprises screenshots of typical end-user applications such as Microsoft Office, buttons, menus, texts, window skins, and the like. A visual perception technique is then utilized that is built on top of a regression analysis and combines the image quality techniques in a particular way and provides an improved visual perception quality measurement. The proposed quality metric can significantly improve the correlation to human subjective quality ratings.

Figure 1:
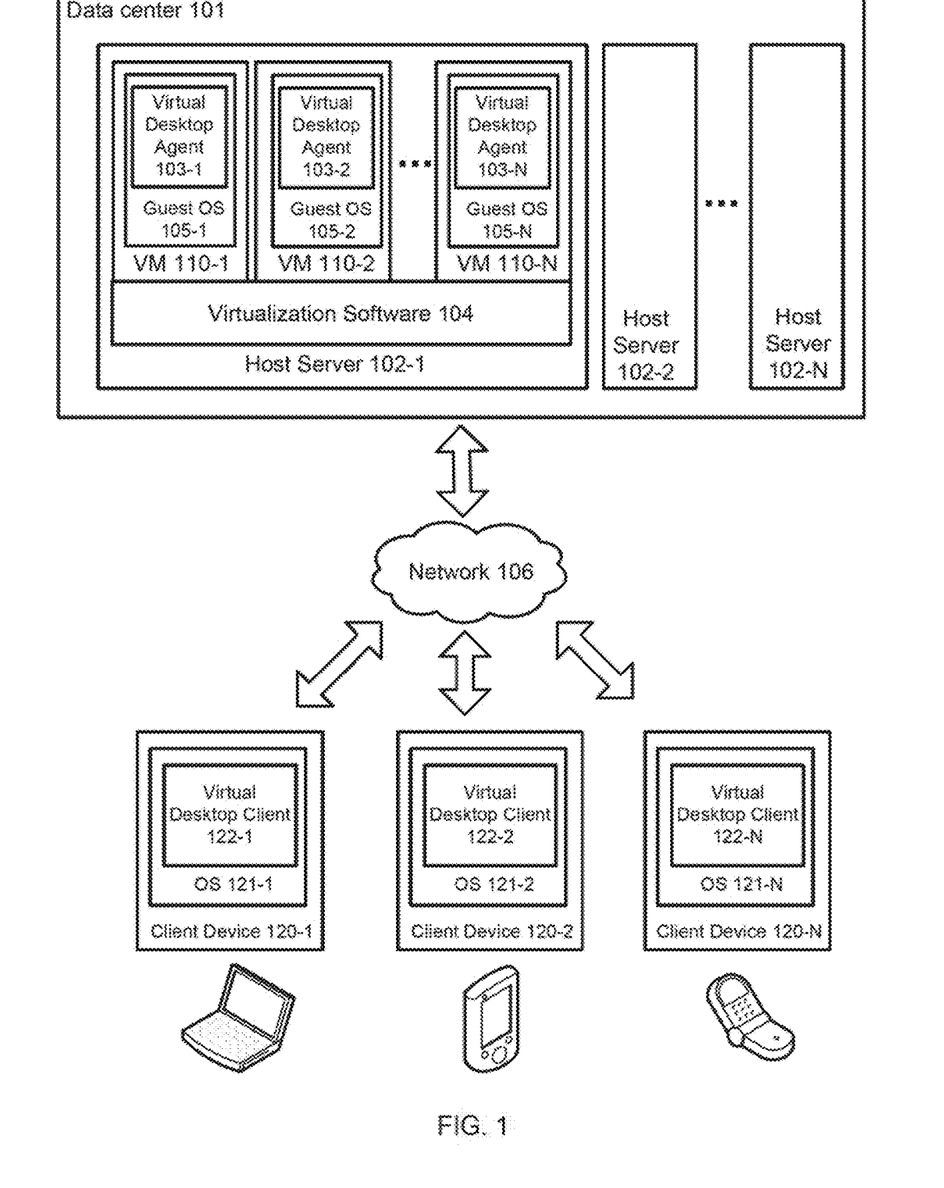
FIG. 1 illustrates an example of a virtual desktop infrastructure (VDI) environment, in accordance with various embodiments.

FIG. 1 illustrates an example of a virtual desktop environment, in accordance with various embodiments. The virtual desktop environment, such as VDI or DAAS environment, includes host servers (102-1, 102-2, 102-N) that are communicatively connected to a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as to not obscure salient features of the VDI environment. Host servers (102-1, 102-2, 102-N) may physically reside in a data center 101 of the enterprise (e.g., in case of VDI) or in a data center of a third party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102. In this context, the term "desktop" refers to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client application (e.g., 122-1, 122-2, 122-N). The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

In various embodiments, the virtual desktops hosted on the host servers (102-1, 102-2, 102-N) can be delivered to the client devices (120-1, 120-2, 120-N) using a wide variety of hardware and software resources. For example, different central processing unit (CPU) architectures can be employed on the host servers; different storage equipment (e.g., storage arrays, SSD, hybrid solutions, etc.) and different storage architectures (e.g., VSAN, SAN, etc.) can be utilized to store the data of the virtual desktops and the like. The selection of resource types and the amount of resources dedicated to the system can significantly affect the performance of the virtual desktops to the end user. In many cases, different configurations and optimizations (both software and hardware) can also affect the delivery and performance of virtual desktops. For example, increasing or decreasing the number of virtual machines running on a single host or scaling the number of hosts may impact performance of the virtual desktops.

It is therefore useful for any enterprise or service provider that is deploying a virtual desktop solution to measure how the type and amount of resources, as well as the different configurations and optimizations affect the end user's experience. Moreover, it is useful to obtain quantitative measurements regarding both the responsiveness and the image quality of the virtual desktop so that appropriate decisions can be made about the allocation of resources and configuration and optimization settings for those resources. The embodiments described in the present disclosure are particularly directed to obtaining accurate and quantitative visual perception metrics that are in line with subjective human ratings.

Figure 2:
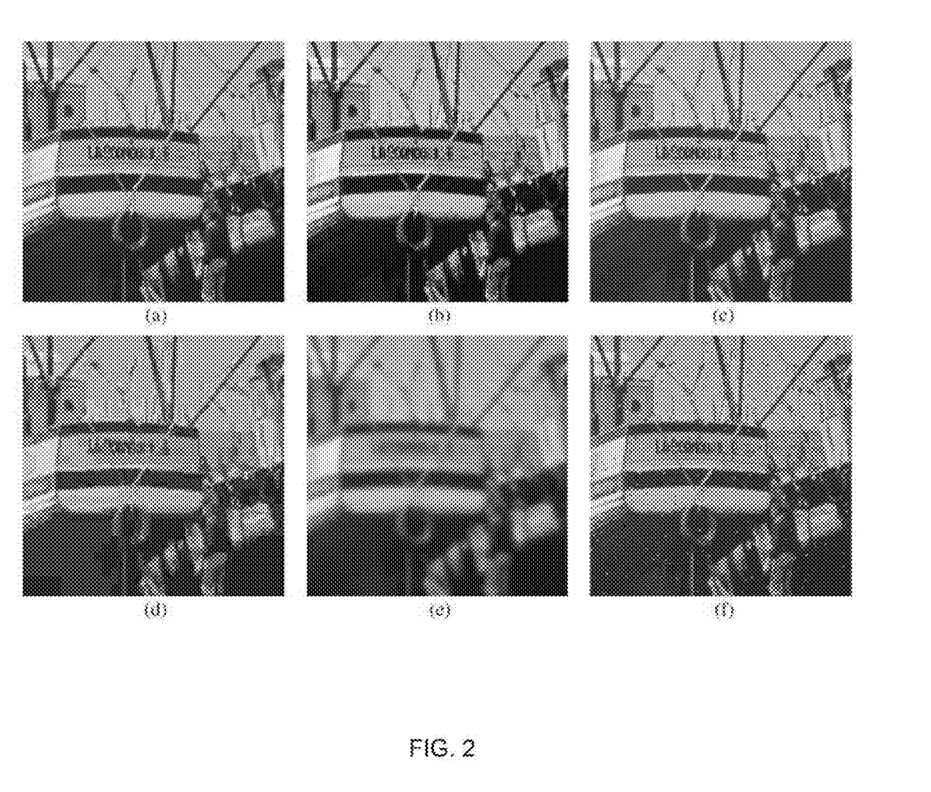
FIG. 2 is an example set of images that illustrate some shortcomings of utilizing conventional image quality techniques.

FIG. 2 is an example set of images that illustrate some shortcomings of utilizing conventional image quality techniques. As mentioned above, there have been a number of image quality measuring techniques that have been proposed in the fields of video and image processing. Four of these techniques are described in some detail below.

The image quality metrics that have been proposed for measuring image quality include (1) MSE (Mean Squared Error), (2) PSNR (Peak Signal to Noise Ratio), (3) SSIM (Structural Similarity) and (4) FSIM (Feature Similarity). These metrics are all full-reference metrics, meaning that the original or "distortion-free" image is available as a reference image. Each of these metrics is discussed separately below. In the discussion below, the variable R is used to represent the "distortion-free" grayscale reference image and the variable D is used to represent the grayscale distorted image (e.g. image after compression or transmission).

(1) Mean Squared Error (MSE)—As one of the most widely used error estimators, MSE measures the average of the squares of the errors. MSE is defined using the equation below:

$$MSE(D, R) = \frac{1}{mn} \sum_{i=0}^{m-1} \sum_{j=0}^{n-1} (D[i, j] - R[i, j])^2$$

In the MSE equation above, m represents the width and n represents the height (in pixels) of a grayscale image.

(2) Peak Signal to Noise Ratio (PSNR)—Most commonly used to measure the reconstruction quality of lossy image and video codecs, PSNR is defined using the equation below:

$$PSNR(D, R) = 10 \log_{10} \frac{MAX^2}{MSE}$$

In the PSNR equation above, MSE can be derived by using the equation (1) describe above and MAX represents the maximum possible pixel intensity value. In one embodiment, the MAX value can be selected to be 255 (8 bits).

(3) Structural Similarly (SSIM)—Based on the hypothesis that HVS is highly adapted to extract the structural information from the visual scene, SSIM aims to capture the loss of structure in the image. Mathematically, SSIM is defined using the equation below:

$$SSIM(D, R) = \frac{(2\mu_D\mu_R + c_1)(2\sigma_{DR} + c_2)}{(\mu_D^2 + \mu_R^2 + c_1)(\sigma_D^2 + \sigma_R^2 + c_2)}$$

In the SSIM equation above, variables $\mu_D$ and $\mu_R$ represent the average intensity of image D and image R. Variables $\sigma^2_D$, $\sigma^2_R$ and $\sigma_{DR}$ represent the variance of image D, the variance of image R and the covariance of image D and image R respectively.

(4) Feature Similarity (FSIM)—Leveraging the phase congruency feature, the dimensionless measure of the significance of a local structure, as the primary feature, FSIM achieves superior performance compared to other conventional metrics with more computational complexity introduced in equation (1) above. In simple form, FSIM is defined using the equation below:

$$FSIM(D, R) = \frac{\sum_{x \in \Omega} S_L(x) PC_m(x)}{\sum_{x \in \Omega} PC_m(x)}$$

In the FSIM equation above, $S_L(x)$ is the similarity map derived from the phase congruence feature $PC_m(x)$ and gradient magnitude feature $GM_m(x)$. The variable $\Omega$ represents the entire image spatial domain. Further information and details about FSIM can be found in L. Zhang, D. Zhang, and X. Mou, "Fsim: a feature similarity index for image quality assessment," *Image Processing, IEEE Transactions on*, vol. 20, no. 8, pp. 2378-2386, (2011), which is incorporated herein by reference in its entirety.

Each of the conventional techniques described above provides some measure of quantitatively measuring the quality of an image. However, in the context of VDI and DAAS, these techniques do not perform satisfactorily. For example, as shown in FIG. 2, the images (a), (b), (c), (d), (e), (f) all have identical MSE and PSNR scores however, as evident from the images, the actual visual perception differs significantly between each image. Even for the more advanced conventional metrics, such as SSIM or FSIM, their performances depend largely on the images under investigation. Most image quality assessment studies have been largely focused on natural images. In VDI environment, however, the desktop screen images are varied. The desktop screen may present images with sharp edges that include text and windows, such as in a situation where a user is using Microsoft Word. It may also display colorful natural images, such as in situations where the user is using photo viewing software. Small icons and menu bars typically present in virtual desktop interfaces further increase the complexity of the visual quality assessment. In view of all these differences, conventional metrics fail to achieve the same level of performance on virtual desktop images as they do on the natural images. Therefore, the present disclosure proposes a specific visual image quality metric for virtual desktop environments.

Figure 3:
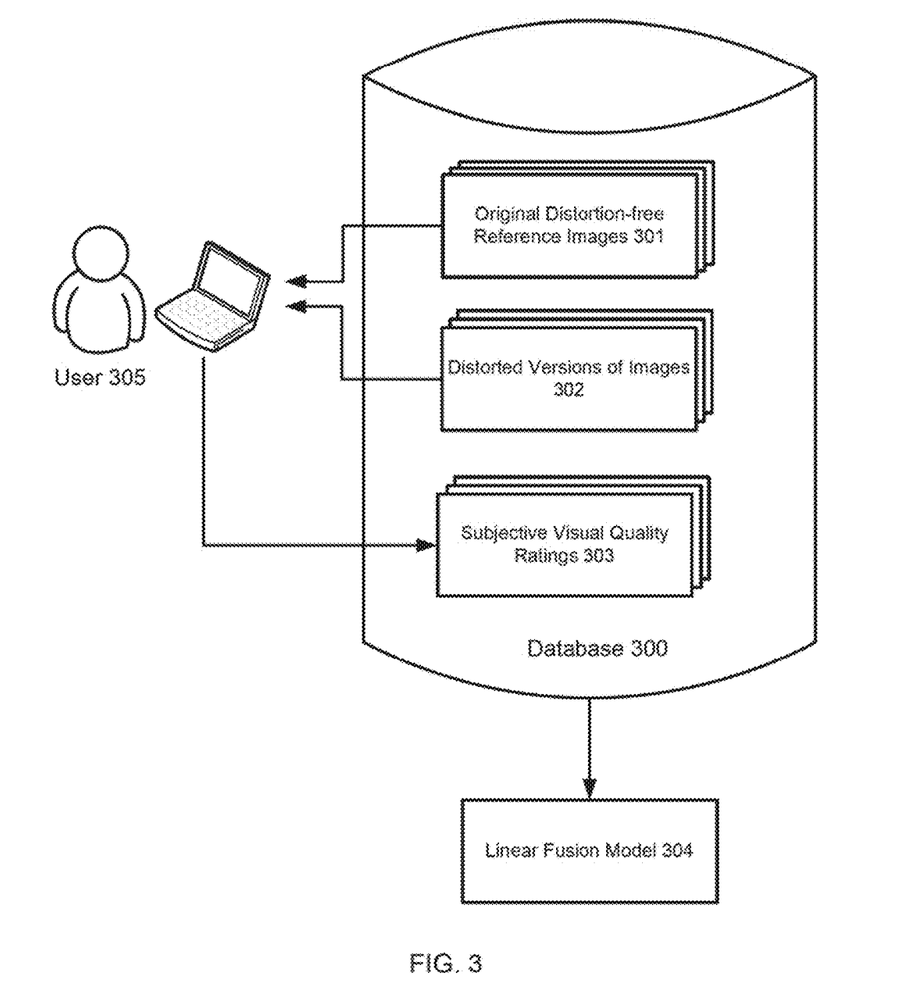
FIG. 3 illustrates an example of a benchmark database being used to train a linear fusion model that can be used to compute a visual quality metric, in accordance with various embodiments.

FIG. 3 illustrates an example of a benchmark database being used to train a linear fusion model that can be used to compute a visual quality metric, in accordance with various embodiments. As illustrated in the figure, the benchmark test database 300 is composed of three parts: distortion-free reference images 301, distorted versions of those images 302 and subjective visual quality ratings 303. For example, the reference images 301 may comprise 15 images of the same size (400×400) but different types, including desktop background, pure text, icons, windows, menus and combinations of the foregoing. All images may be actual screenshots from conventional desktop applications (e.g. Microsoft Word, Adobe Reader, Internet Explorer Browser, etc.) on virtual desktops.

The distorted images 302 are images that have been distorted by the various processes (e.g., compression, transmission, etc.) involved in remoting the GUI of the virtual desktop to the client device. For example, the distorted images 302 may comprise 150 distorted images (e.g., 10 distorted versions of each reference image) that have been distorted by two types of distortions: JPEG compression and PCoIP protocol. The reason of selecting these particular distortions in this example is that they are most common distortion sources in the VDI environment, however it should be evident to one of ordinary skill in the art that images with other types of distortion may be utilized to train the linear fusion model in accordance with various alternative embodiments. JPEG is a common compression technique used in remote virtual desktop protocols. Examples of remote virtual desktop protocols include PC-over-IP (PCoIP), virtual network computing (VNC), remote desktop protocol (RDP) and the like. PCoIP itself can adaptively choose multiple compression algorithms as needed.

When selecting distorted images 302, it may be advantageous to select a variety of different quality levels, encoding parameters or other variables. Following the example above where 10 distorted versions of each reference image are selected, one option may be to select six JPEG compression quality levels (e.g. 1, 20, 40, 60, 80 and 100) and four PC-o-IP quality levels (e.g. 30, 50, 70 and 90). Particularly at the lowest quality settings, JPEG and PCoIP lowest quality distortions typically show very different visual distortions and thus including both types of distortion can be useful.

The subjective visual quality ratings 303 can be obtained from a number of users, such as user 305, and reflect the actual visual perception of the image by a real human being. For example, the five quality levels for ratings may be "bad," "poor," "fair," "good" and "perfect"; and in some embodiments, these quality ratings may be represented by numbers (e.g. ratings from 1 to 5). During the test, the distortion-free reference image and the distorted image are displayed side by side in front of the user 305. The user 305 is instructed to choose one of the five quality levels that best matches his/her impression on the quality of each tested distorted image compared to the reference image. Once obtained from the user, these ratings can be stored in the database as subjective visual perception ratings 303.

The benchmark database 300 can be used as input for training a linear fusion model 304 that combines the various image quality metrics in a particular unique way. By combining all conventional metrics in this way, a novel visual quality metric FUSION can be computed with largely improved robustness and consistency (to the subjective quality ratings) for virtual desktop environments specifically. In various embodiments, the present disclosure is based on a linear model because the scatter maps of conventional metrics versus the subjective quality ratings shows approximately linearized distribution. The model is defined by the equation represented below:

$$FUSION = \beta_0 + \beta_1 * MSE + \beta_2 * PSNR + \beta_3 * SSIM + \beta_4 * FSIM \quad (5)$$

In the equation (5) above, $\beta_i$ represents the model parameters to be estimated. Equation (5) is a typical linear regression problem and the equivalent goal is to find the best parameters that can minimize the mean squared error below:

$$\mathop{argmin}_{\beta_i, i \in [0,4]} \|FUSION - S\|^2 + \lambda \sum_{i \in [0,4]} \beta_i^2 \quad (6)$$

In the equation (6) above, S is the averaged subjective quality ratings. To avoid overfitting, a regularizer is $\lambda$ introduced.

Following the example discussed above where the benchmark database includes 15 reference images and 150 distorted images and considering the relatively small size of such a dataset, 10-fold cross validation can be used to train and validate the linear fusion model. After training, the final fusion model based on the particular sample data set is derived as:

$$FUSION = -18.17 + 0.02 PSNR + 3.44 SSIM + 17.83 FSIM \quad (7)$$

This linear fusion model can be used to compute a visual quality metric that consistently correlates with the subjective human visual quality ratings. Furthermore, equation (7) validates the initial assumption that single conventional image quality metric is not enough to achieve the best result in virtual desktop scenario. As can be seen from the equation (7), the fusion model consists of three metrics: PSNR, SSIM and FSIM. The reason MSE is not selected is mainly because PSNR is actually a mathematical transform of MSE. Also, since SSIM and FSIM have the same value range [0,1], it can be seen that FSIM plays a relatively more important role in this model compared to SSIM. For PSNR, however, even though its weight is only 0.02, it should still not be neglected because of PSNR's large value range.

Figure 4:
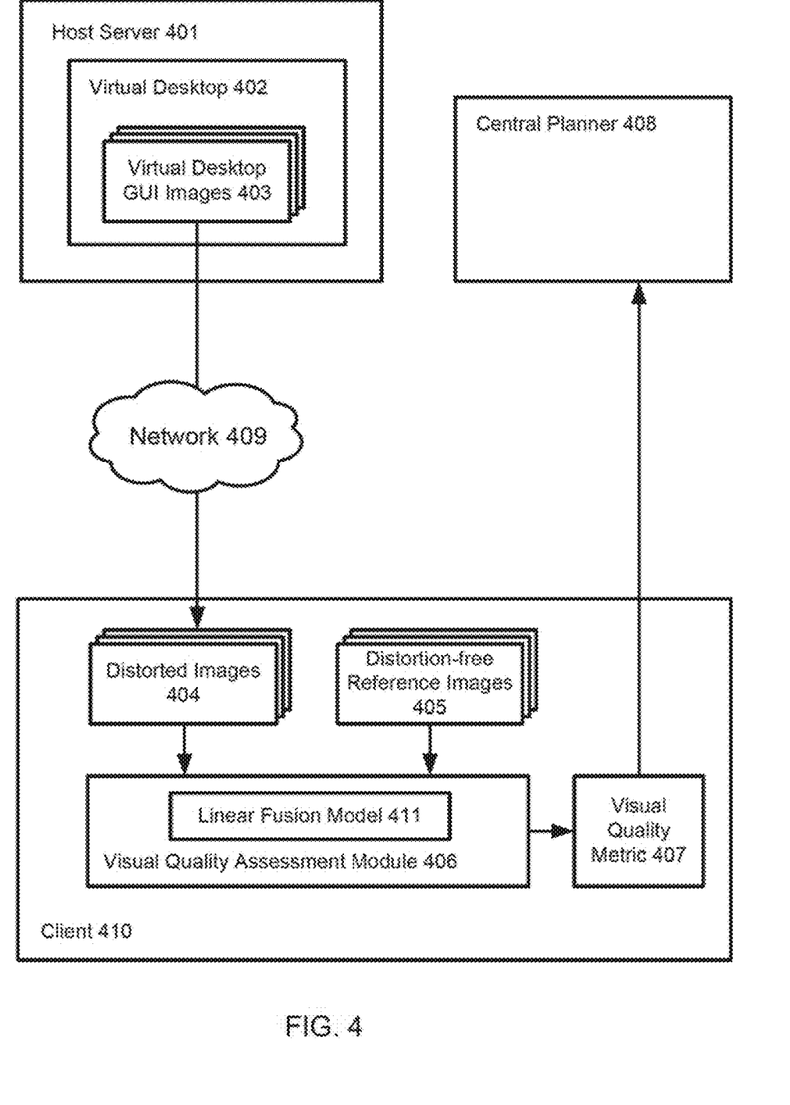
FIG. 4 illustrates the use of the quantitative visual perception quality metric being used in virtual desktop infrastructure, in accordance with various embodiments.

FIG. 4 illustrates the use of the quantitative visual perception quality metric being used in virtual desktop infrastructure, in accordance with various embodiments. As illustrated, a host server 401 is hosting a virtual desktop 402 which generates a graphical user interface (GUI) and transmits virtual desktop GUI images 403 to the client 410 over a network 409. The network can be any type of network, however most commonly is a wide area network (WAN), such as the Internet. The host server may further include virtualization software for hosting multiple virtual machines, where each virtual machine corresponds to an individual virtual desktop.

In the illustrated embodiment, the client 410 receives a set of distorted images 404 from the server 401 and displays them (e.g. on a display screen). Screenshots of the distorted images 404 are then captured and compared to a set of corresponding distortion-free reference images 405, which are also available on the client 410. In one embodiment, a visual quality assessment module 406 uses the linear fusion model 411 to compute a visual quality metric 407. In particular, the visual quality metric 407 for each screenshot of a distorted image is computed by using the linear fusion model 411 that combines a peak signal to noise ratio (PSNR) score of the distorted image, a structural similarity (SSIM) score of the distorted image and a feature similarity (FSIM) score of the distorted image. In one embodiment, the PSNR, SSIM and FSIM scores are weighted according to the equation (7) described above. In other embodiments, the PSNR, SSIM and FSIM scores are combined using other weightings as can be derived from other data sets with different distorted images, reference images and subjective human visual quality ratings.

In the illustrated embodiment, after the visual quality metric 407 has been computed, the client 410 uploads the visual quality metric 407 to a central planner 408. The central planner 48 can process a plurality of visual quality metrics received from a multiple different client device to compute an average visual quality metric of the distorted images among all the client devices. This average quality metric can be used to benchmark and/or adjust the resource allocation for hosting the virtual desktop infrastructure. For example, the average quality metric can be used to benchmark different CPU architectures, different host computing devices, different storage architectures, different configurations or different optimizations. In some embodiments, the average quality metric can be combined with other metrics, such as metrics for measuring responsiveness of the virtual desktop.

Figure 5:
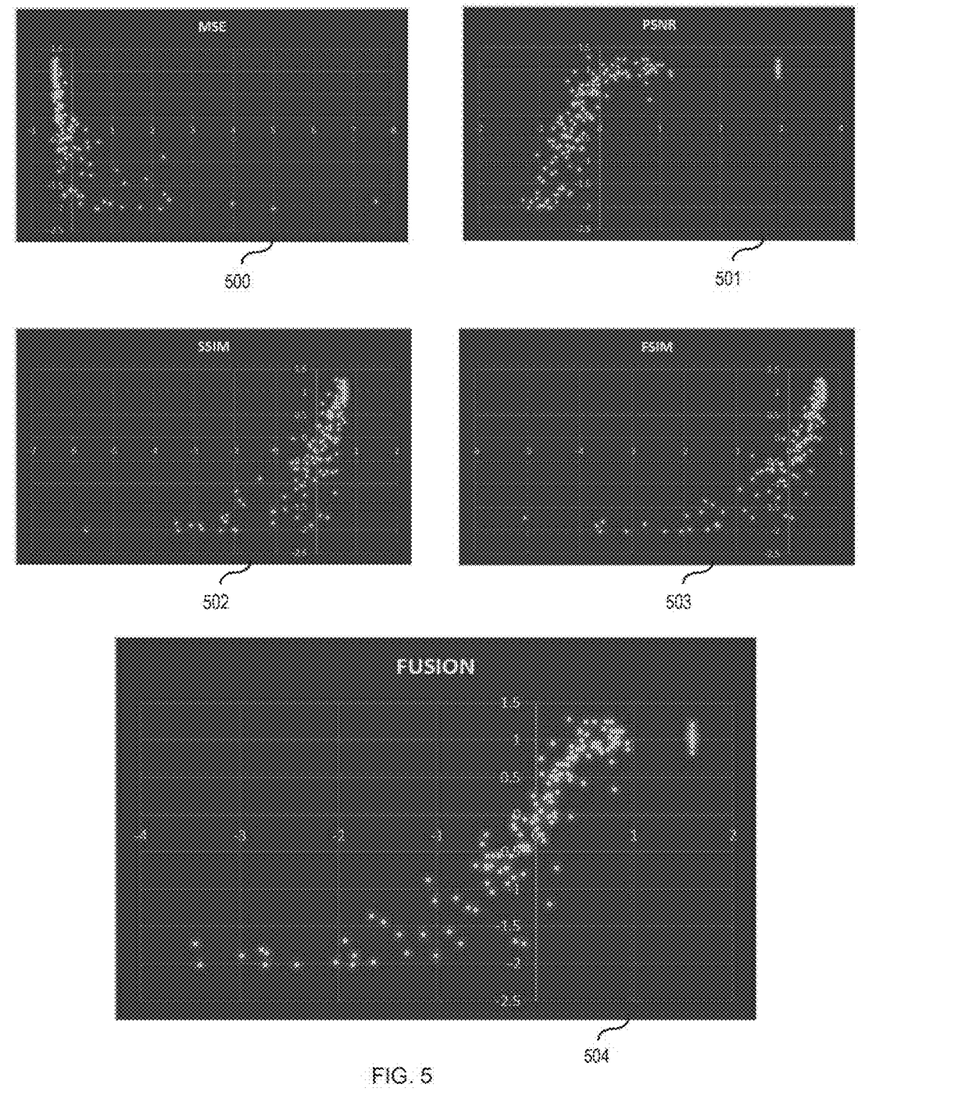
FIG. 5 illustrates an example of the scatter maps of different image quality metric scores versus the averaged subjective human quality ratings.

FIG. 5 illustrates an example of the scatter maps of different image quality metric scores versus the averaged subjective human quality ratings. Each graph (500, 501, 502, 503 and 504) illustrates the correlation between the subjective human visual quality ratings and the image quality metric computed using the different techniques. The coordinates on the y-axis correspond to the subjective human visual quality ratings (from 1 to 5, as described in the example discussed in FIG. 3). The coordinates on the x-axis correspond to the computed visual quality metric scores using each particular technique illustrated. All data in the figure is shown in normalized values.

From the scatter maps, it is evident that the various metrics correlate with the subjective quality ratings in their own individual ways. The scatter maps of MSE 500, SSIM 502 and FSIM 503 show a similar high density around high quality ratings area. Around the low quality ratings area, however, the points are sparsely distributed and deviate from the direction formed by the points of high density area. This kind of distribution indicates lower linear correlation of the two variables. As a comparison, points on PSNR 501 and FUSION 504 are more evenly distributed along their courses. However, according to equation (2), we can expect that a non-linear relationship is more appropriate than a linear one for PSNR.

To further evaluate the performance of the image quality metrics, the PLCC (Pearson Linear Correlation Coefficient) of the metric scores and the averaged subjective quality ratings can be calculated. In one scenario, three different types of image content can be analyzed: text, mixed and combined. Specifically, the text images are pure text contents, such as the text region of a Microsoft Word document. The mixed images are the mixture of text and other types of contents (e.g. background, windows, menus, icons, etc.). The combined images are simply the combination of the text images and mixed images. Table I below shows the PLCC scores of different metrics on the three different types of image contents.

TABLE I

Performance Comparison

| Image Type | PSNR | SSIM | FSIM | FUSION |
|---|---|---|---|---|
| Text | 0.80 | 0.92 | 0.90 | 0.95 |
| Mixed | 0.83 | 0.81 | 0.79 | 0.87 |
| Combined | 0.67 | 0.79 | 0.81 | 0.87 |

Comparing the performances in Table I with performances on natural images of conventional metrics, the conventional metrics fail to provide the same level of consistency to the subjective quality ratings on virtual desktop images. Also, it is evident that SSIM outperforms other conventional metrics on the text images and PSNR surprisingly achieves the best results on the mixed images. Most importantly, the linear fusion model described herein provides improved performance among all other metrics regardless of the different categories of image contents.

Figure 6:
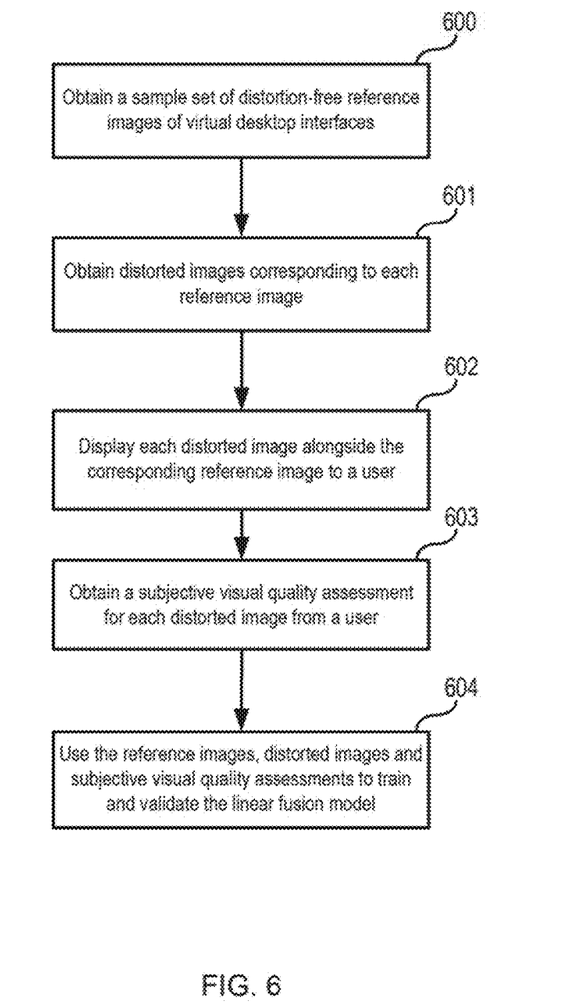
FIG. 6 illustrates a process for training a linear fusion model, in accordance with various embodiments.

FIG. 6 illustrates a process for training a linear fusion model, in accordance with various embodiments. In operation 600, the process begins with obtaining a sample set of distortion-free reference images of virtual desktop interfaces or portions thereof. For example, the images may contain portions of word processing applications, spreadsheet applications, photo viewing software, multiple windows, text, graphics, icons, bars and other imagery typically found in virtual desktop GUIs. In operation 601, a set of distorted versions of each reference image is created. The distorted images may be distorted by typical sources of distortion that are present during the remoting of user interfaces over a network, such as compression (e.g. JPEG) and/or remote desktop protocol (e.g., PCoIP).

In operation 602, the distorted image is displayed to a user, alongside the distortion-free reference image. The user is asked to provide a subjective human visual quality rating for the distorted image (e.g., from 1 to 5, or selected from "poor," "fair," "good" and "perfect" as described above). In operation 603, the system obtains a subjective visual quality assessment score for each distorted image from the user. These subjective visual quality assessments can be stored in the benchmark database (along with the distorted images and the reference images). The information in the database, including the reference images, distorted images and the subjective visual quality assessment scores are then used to train the linear fusion model, as illustrated in operation 604. Based on the training of the linear fusion mode, the appropriate weightings of each visual quality metric (PSNR, SSIM, FSIM) are obtained and these weightings will be used to compute the overall visual quality metric in the context of virtual desktop GUI remoting.

Figure 7:
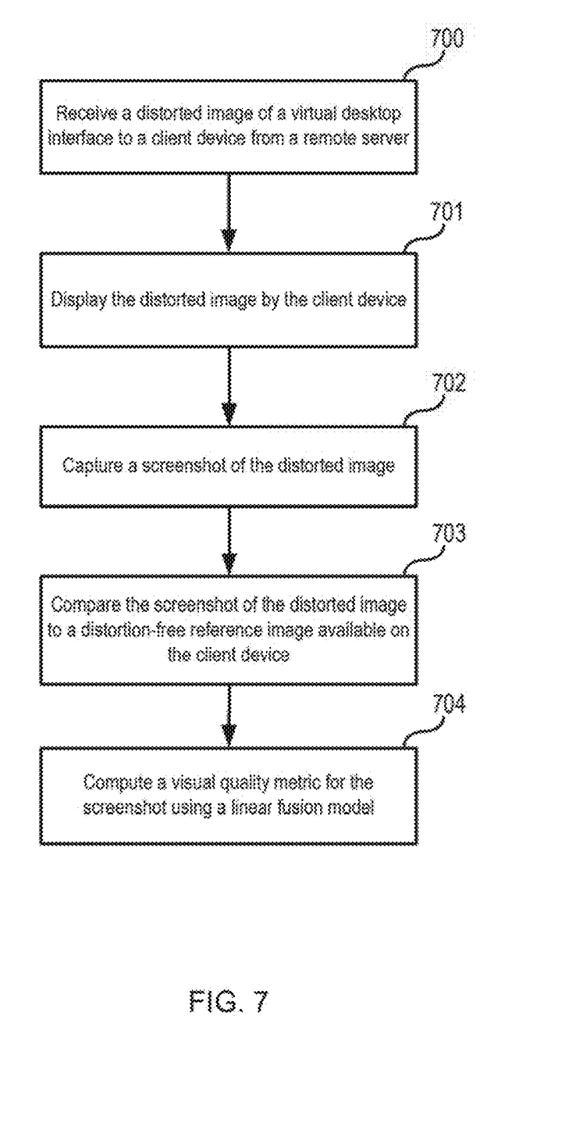
FIG. 7 illustrates a process for utilizing the linear fusion model to compute a visual quality metric for an image, in accordance with various embodiments.

FIG. 7 illustrates a process for utilizing the linear fusion model to compute a visual quality metric for an image, in accordance with various embodiments. In operation 700, the client device receives a distorted image of a virtual desktop interface that has been generated on the server. In operation 701, the client displays the distorted image, such as by rendering the image on the display screen. In operation 702, a screenshot of the distorted image is captured by the client device (e.g., by a visual quality assessment module operating on the client device). The visual quality assessment module then compares the screenshot of the distorted image to a corresponding distortion-free reference image that is available on the client device, as shown in operation 703. Based on the comparison, the visual quality assessment module computes a visual quality metric for the screenshot of the distorted image by using a linear fusion model trained in accordance with the principles described herein, as shown in operation 704. In one embodiment, the linear fusion model combines the PSNR score of the distorted image, the SSIM score of the distorted image and the FSIM score of the distorted image, where each score is weighted according to the equation (7) described above.

Figure 8:
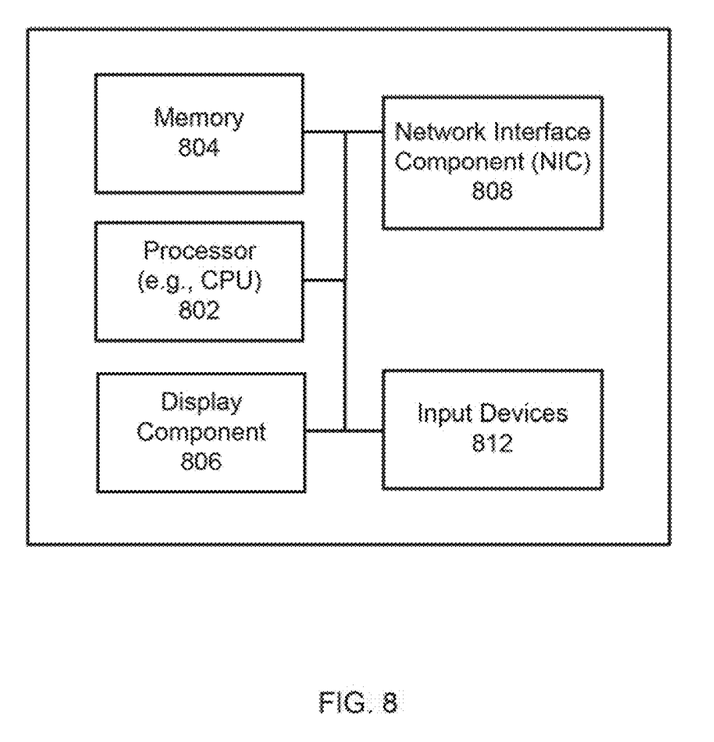
FIG. 8 illustrates an example of some general components of a computing device, in accordance with various embodiments.

FIG. 8 illustrates an example of some general components of a computing device, in accordance with various embodiments. In this particular example, the device includes one or more processors (e.g., central processing units (CPUs) 802 for executing instructions that can be stored in physical memory component 804. The memory component 804 can include many types of memory, data storage, or non-transitory computer-readable storage media, such as random access memory (RAM) storing program instructions for execution by the processor 802, a separate form of storage for images or data, a removable memory for sharing information with other devices and the like. The computing device typically can further comprise a display component 806, such as a monitor, a touch screen, liquid crystal display (LCD), or the like. In various embodiments, the computing device will include at least one input device 808 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 808 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for quantitatively measuring visual perception of display information of a virtual desktop, the method comprising:
obtaining a set of reference virtual desktop images including one or more of desktop background images, text, icons, windows, or menus;
generating distorted versions of the reference virtual desktop images that have been distorted by processes involved in remoting a graphical user interface of the virtual desktop;
receiving a set of subjective visual quality ratings corresponding to the distorted versions of the reference virtual desktop images;
training a linear fusion model using as input the set of reference virtual desktop images, the distorted versions and the set of subjective visual quality ratings to determine a set of weightings, wherein the linear fusion model combines a peak signal to noise ratio (PSNR) score, a structural similarity (SSIM) score and a feature similarity (FSIM) score according to the determined weightings;
receiving a distorted image of a virtual desktop interface displayed by a remote server, the distorted image received by a client device from the remote server over a network connection;
displaying the distorted image of the virtual desktop interface by the client device and capturing a screenshot of the distorted image;
comparing the screenshot of the distorted image to a distortion-free reference image by the client device; and
computing a visual quality metric for the screenshot of the distorted image using the trained linear fusion model, wherein resource allocation for hosting the virtual desktop is adjusted based at least in part on the visual quality metric.

2. The method of claim 1, further comprising:
uploading the visual quality metric of the distorted image to a central planner; and
processing a plurality of visual quality metrics received from a plurality of client devices by the central planner to compute an average visual quality metric of the distorted image among the plurality of client devices.

3. The method of claim 1, wherein the linear fusion model combines the PSNR score, SSIM score and FSIM score according to a relationship:

visual quality metric=−18.17+0.02(PSNR)+ 3.44(SSIM)+17.83(FSIM).

4. The method of claim 1, wherein the visual quality metric is used to benchmark one or more of: different CPU architectures, different host computing devices, different storage architectures, different configurations or different optimizations.

5. The method of claim 4, wherein the visual quality metric is combined with a metric measuring responsiveness of the virtual desktop interface at the client device.

6. The method of claim 1, wherein the virtual desktop is executed on a virtual machine managed by a hypervisor executed on the server, the virtual machine associated with a user of the first client device.

7. A non-transitory computer readable storage medium comprising one or more sequences of instructions, the instructions when executed by one or more processors causing the one or more processors to execute the operations of:
obtaining a set of reference virtual desktop images including one or more of desktop background images, text, icons, windows, or menus;
generating distorted versions of the reference virtual desktop images that have been distorted by processes involved in remoting a graphical user interface of the virtual desktop;
receiving a set of subjective visual quality ratings corresponding to the distorted versions of the reference virtual desktop images;
training a linear fusion model using as input the set of reference virtual desktop images, the distorted versions and the set of subjective visual quality ratings to determine a set of weightings, wherein the linear fusion model combines a peak signal to noise ratio (PSNR) score, a structural similarity (SSIM) score and a feature similarity (FSIM) score according to the determined weightings;

receiving a distorted image of a virtual desktop interface displayed by a remote server, the distorted image received by a client device from the remote server over a network connection;

displaying the distorted image of the virtual desktop interface by the client device and capturing a screenshot of the distorted image;

comparing the screenshot of the distorted image to a distortion-free reference image by the client device; and computing a visual quality metric for the screenshot of the distorted image using the trained linear fusion model, wherein resource allocation for hosting the virtual desktop is adjusted based at least in part on the visual quality metric.

8. The non-transitory computer readable storage medium of claim 7, further comprising instructions to cause the one or more processors to execute the operations of:

uploading the visual quality metric of the distorted image to a central planner; and processing a plurality of visual quality metrics received from a plurality of client devices by the central planner to compute an average visual quality metric of the distorted image among the plurality of client devices.

9. The non-transitory computer readable storage medium of claim 7, wherein the linear fusion model combines the PSNR score, SSIM score and FSIM score according to a relationship:

$$\text{visual quality metric} = -18.17 + 0.02(\text{PSNR}) + 3.44(\text{SSIM}) + 17.83(\text{FSIM}).$$

10. The non-transitory computer readable storage medium of claim 7, wherein the visual quality metric is used to benchmark one or more of: different CPU architectures, different host computing devices, different storage architectures, different configurations or different optimizations.

11. The non-transitory computer readable storage medium of claim 10, wherein the visual quality metric is combined with a metric measuring responsiveness of the virtual desktop interface at the client device.

12. The non-transitory computer readable storage medium of claim 7, wherein the virtual desktop is executed on a virtual machine managed by a hypervisor executed on the server, the virtual machine associated with a user of the first client device.

13. A computing device, comprising:
one or more processors; and
memory including instructions that when executed by the one or more processors, cause the computing device to:
obtain a set of reference virtual desktop images including one or more of desktop background images, text, icons, windows, or menus;

generate distorted versions of the reference virtual desktop images that have been distorted by processes involved in remoting a graphical user interface of the virtual desktop;

receive a set of subjective visual quality ratings corresponding to the distorted versions of the reference virtual desktop images;

train a linear fusion model using as input the set of reference virtual desktop images, the distorted versions and the set of subjective visual quality ratings to determine a set of weightings, wherein the linear fusion model combines a peak signal to noise ratio (PSNR) score, a structural similarity (SSIM) score and a feature similarity (FSIM) score according to the determined weightings;

receive a distorted image of a virtual desktop interface displayed by a remote server, the distorted image received by a client device from the remote server over a network connection;

display the distorted image of the virtual desktop interface by the client device and capturing a screenshot of the distorted image;

compare the screenshot of the distorted image to a distortion-free reference image by the client device; and compute a visual quality metric for the screenshot of the distorted image using linear fusion model, wherein resource allocation for hosting the virtual desktop is adjusted based at least in part on the visual quality metric.

14. The computing device of claim 13, wherein the memory further includes instructions that cause the computing device to:

uploading the visual quality metric of the distorted image to a central planner; and processing a plurality of visual quality metrics received from a plurality of client devices by the central planner to compute an average visual quality metric of the distorted image among the plurality of client devices.

15. The computing device of claim 13, wherein the linear fusion model combines the PSNR score, SSIM score and FSIM score according to a relationship:

$$\text{visual quality metric} = -18.17 + 0.02(\text{PSNR}) + 3.44(\text{SSIM}) + 17.83(\text{FSIM}).$$

16. The computing device of claim 13, wherein the visual quality metric is used to benchmark one or more of: different CPU architectures, different host computing devices, different storage architectures, different configurations or different optimizations.

17. The computing device of claim 16, wherein the visual quality metric is combined with a metric measuring responsiveness of the virtual desktop interface at the client device.

* * * * *